(12) United States Patent
Miura

(10) Patent No.: US 8,905,123 B2
(45) Date of Patent: Dec. 9, 2014

(54) RADIATOR FAN CONTROL FOR HEAT PUMP HVAC

(75) Inventor: Shimpei Miura, Rancho Palos Verdes, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 33 days.

(21) Appl. No.: 13/206,246

(22) Filed: Aug. 9, 2011

(65) Prior Publication Data

US 2011/0289946 A1  Dec. 1, 2011

Related U.S. Application Data

(62) Division of application No. 12/127,567, filed on May 27, 2008.

(51) Int. Cl.
| | |
|---|---|
| B60H 1/00 | (2006.01) |
| F28F 17/00 | (2006.01) |
| F24F 11/06 | (2006.01) |
| F24H 3/06 | (2006.01) |
| F25D 21/06 | (2006.01) |
| F25D 21/00 | (2006.01) |
| B60H 1/02 | (2006.01) |
| F25B 47/00 | (2006.01) |
| F25B 30/02 | (2006.01) |

(52) U.S. Cl.
CPC .......... *B60H 1/02* (2013.01); *F25B 47/006* (2013.01); *F25B 30/02* (2013.01); *F25B 2600/11* (2013.01); *F25B 2700/02* (2013.01); *F25B 2700/2106* (2013.01); *H01M 2250/20* (2013.01); *H01M 2250/405* (2013.01); *Y02T 90/32* (2013.01); *Y02B 90/16* (2013.01)

USPC .......... 165/202; 165/233; 165/244; 165/247; 165/122; 62/156; 62/272

(58) Field of Classification Search
USPC .......... 165/202, 224, 231, 233, 244, 247, 42, 165/43, 97, 122; 62/80, 150, 151, 156, 272, 62/324.5
See application file for complete search history.

(56) References Cited

U.S. PATENT DOCUMENTS

| | | | |
|---|---|---|---|
| 3,995,603 A | 12/1976 | Thien et al. | |
| 4,327,674 A | 5/1982 | Takei | |
| 4,371,047 A | 2/1983 | Hale et al. | |
| 4,745,766 A | 5/1988 | Bahr | |
| 4,858,565 A | 8/1989 | King | |
| 4,979,584 A | 12/1990 | Charles | |
| 5,704,217 A * | 1/1998 | Itoh et al. ........ | 62/150 |

(Continued)

*Primary Examiner* — Allana Lewin
*Assistant Examiner* — Travis Ruby
(74) *Attorney, Agent, or Firm* — Snell & Wilmer LLP

(57) ABSTRACT

An automobile which includes a radiator fan control for heat pump HVAC which can selectively reverse fan direction based on ambient temperature and moisture to reduce ice buildup on a liquid-gas converter. The automobile may include a liquid-gas converter located within an engine bay, a radiator located adjacent the liquid-gas converter, a first fan located adjacent the radiator, a fuel cell and motor with the inverter located adjacent the first fan, the fuel cell supplying electricity to the motor with the inverter to drive the vehicle. The automobile can also include a temperature sensor located on an exterior surface of the automobile to sense an ambient temperature, a heater core connected to the liquid-gas converter and located between the engine bay and the passenger area, and a control unit connected to the first fan, the temperature sensor, and the heater core.

5 Claims, 3 Drawing Sheets

(56) References Cited

U.S. PATENT DOCUMENTS

| | | |
|---|---|---|
| 6,076,488 A | 6/2000 | Yamagishi |
| 6,390,217 B1 | 5/2002 | O'Brien et al. |
| 6,467,538 B1 * | 10/2002 | Acre et al. .................... 165/266 |
| 6,886,624 B2 | 5/2005 | Zobel et al. |
| 6,959,671 B2 | 11/2005 | Nakagawa et al. |
| 7,066,114 B1 | 6/2006 | Hannesen et al. |
| 7,121,368 B2 | 10/2006 | MacKelvie |
| 2005/0257563 A1 | 11/2005 | Hoshi et al. |

* cited by examiner

RADIATOR FAN CONTROL FOR HEAT PUMP HVAC

CROSS REFERENCE TO RELATED APPLICATION

This application is a divisional application of U.S. patent application Ser. No. 12/127,567, entitled "RADIATOR FAN CONTROL FOR HEAT PUMP HVAC," filed on May 27, 2008, the entire disclosure of which is hereby incorporated by reference herein.

BACKGROUND

1. Field

The invention relates to a radiator fan control for heat pump HVAC. More particularly, the invention relates to a radiator fan control for heat pump HVAC which can selectively reverse fan direction based on ambient temperature and reduce ice buildup on a liquid-gas converter.

2. Background

Traditionally, automobiles utilize heat from an internal combustion engine to warm air that is to be distributed into a passenger area of an automobile. In automobiles with high technology energy use such as fuel cells, an engine in the automobile may be relatively efficient such that it does not generate sufficient heat to warm the passengers of the automobile. Thus, an HVAC system may need to include an active heating system to generate heat to distribute to passengers in the automobile.

However, an HVAC system that actively generates heat generally absorbs energy from the ambient air to the automobile to produce the heat. This can be problematic when there is a low temperature in the ambient air because it is difficult to extract energy from ambient air with low energy. Furthermore, the absorption of energy can cause ice to build up on the HVAC system, particularly on the components that are absorbing energy from the ambient air. This is also problematic because the ice build up can also make it more difficult to absorb energy from the ambient air to convert to heat for the passengers.

The ice build up can also be accelerated if there is high moisture content in the air, such as when there is rain, fog, snow, or a relatively high humidity. Furthermore, if the automobile is moving forward, for example, the rain, fog, snow, or air with a relatively high humidity could be forced onto the automobile. This problem is also exacerbated if the automobile is moving at a relatively fast speed as more rain, fog, snow, or air with a relatively high humidity strikes the automobile. Thus, considerable energy must be expended by the HVAC system to generate the heat for the passengers as it seeks to absorb energy from the ambient air with low temperature and/or high humidity (i.e., moisture content).

Therefore, a need exists in the art for a HVAC system which can reduce ice build up on components of the HVAC system and which has an improved efficiency.

SUMMARY

In one embodiment, the present invention is an automobile including a frame having an exterior surface, a first portion defining an engine bay, and a second portion defining a passenger area, a liquid-gas converter located within the engine bay, a radiator located adjacent the liquid-gas converter, a first fan located adjacent the radiator, a fuel cell and/or motor with the inverter located adjacent the first fan, the fuel cell supplying electricity to the motor and inverter to operate the motor, a temperature sensor located on or near the exterior surface of the automobile to sense an ambient temperature, a heater core connected to the liquid-gas converter and located between the engine bay and the passenger area, and a control unit connected to the first fan, the temperature sensor, and the heater core.

When the ambient temperature is below a predetermined temperature, the control unit sends a first signal to the first fan to rotate in a first direction to direct air from an area around the engine towards the liquid-gas converter, and when the ambient temperature is not below the predetermined temperature, the control unit sends a second signal to the first fan to rotate in a second direction to direct ambient air towards the liquid-gas converter.

In another embodiment, the present invention is a method for reducing energy consumption in a HVAC system in an automobile includes the steps of determining an ambient temperature of air adjacent to an exterior of the automobile, transmitting air heated by an engine and a fuel cell to a liquid-gas converter located at a front portion of the automobile when the ambient temperature is below a predetermined temperature, and reducing an amount of ice that forms on the liquid-gas converter.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Apparatus, systems and methods that implement the embodiments of the various features of the invention will now be described with reference to the drawings. The drawings and the associated descriptions are provided to illustrate some embodiments of the invention and not to limit the scope of the invention. Throughout the drawings, reference numbers are re-used to indicate correspondence between referenced elements.

Figure 1:
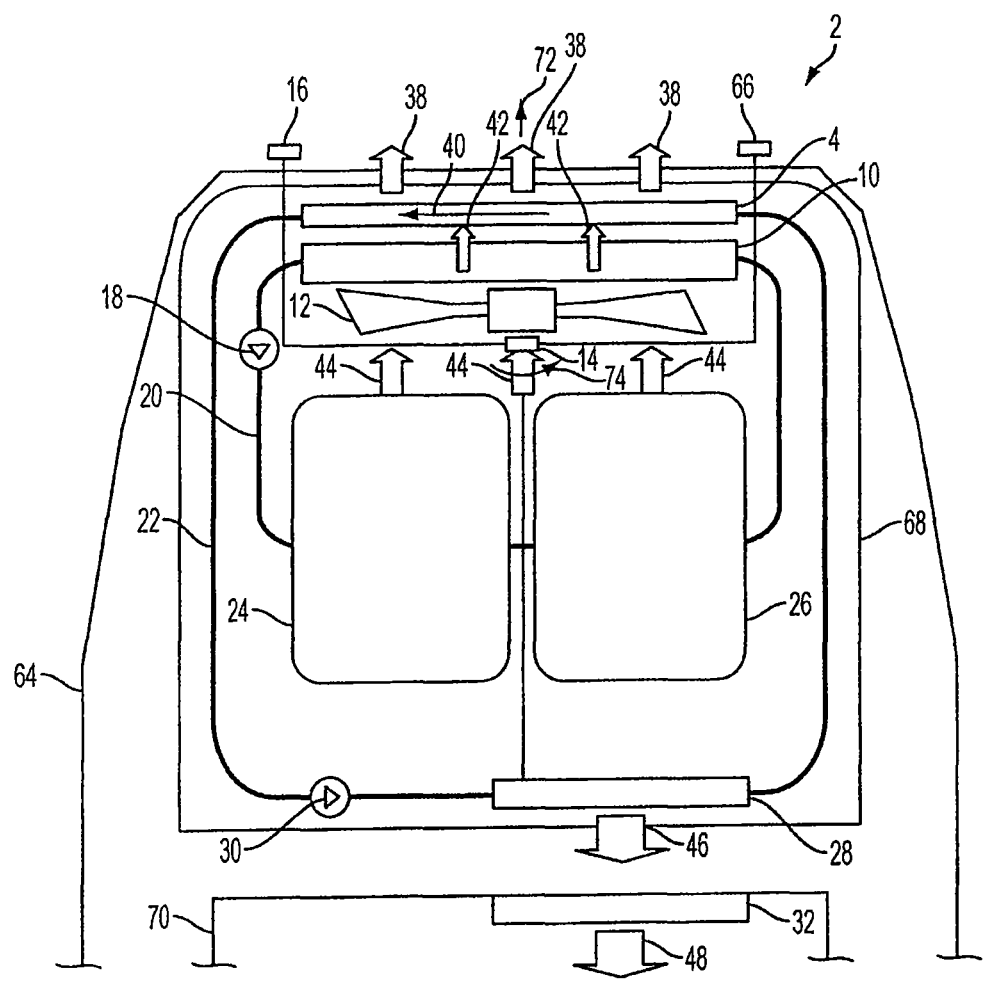
FIG. 1 is a schematic diagram of an HVAC system according to an embodiment of the invention.

FIG. 1 is a schematic diagram of the HVAC system in operation. As shown in FIG. 1, an automobile 2 comprises a frame 64 with an engine bay 68 and a passenger area 70. The automobile 2 can also comprise a liquid gas-converter 4, a radiator 10, a radiator fan 12, a coolant pump 18, a fuel cell 24, a motor with an inverter 26, a heater core 28, a heating, ventilating, and air conditioning ("HVAC") compressor 30, a HVAC loop 22, HVAC fluid 40, a cabin fan 32, a temperature sensor 16, a moisture sensor 66, and a control unit 14.

The HVAC system can comprise, for example, liquid gas-converter 4, radiator fan 12, heater core 28, HVAC compressor 30, HVAC loop 22, HVAC fluid 40, cabin fan 32, temperature sensor 16, moisture sensor 66, and/or control unit 14.

HVAC fluid 40 can flow through HVAC loop 22 and can be in a liquid state, a gaseous state, or a combination of liquid and gaseous state.

Liquid-gas converter 4 is located at a front of the automobile in the engine bay and is connected to HVAC compressor 30 by HVAC loop 22. In one embodiment, liquid gas-converter 4 is an apparatus incorporating a condenser and an evaporator in one device such that it can convert HVAC fluid 40 from liquid to gas when necessary and gas to liquid when necessary. In another embodiment, liquid-gas converter 4 can be just an evaporator to convert HVAC fluid 40 from liquid to gas or just a condenser to convert HVAC fluid 40 from gas to liquid.

HVAC compressor 30 is connected to both liquid-gas converter 4 and heater core 28 through HVAC loop 22. HVAC compressor 30 can raise or lower a pressure of HVAC fluid 40 flowing within HVAC loop 22.

Heater core 28 is connected to HVAC compressor 30 and liquid-gas converter 4 through HVAC loop 22. Cabin fan 32 is located adjacent to heater core 28 to transmit warm air from heater core 28 to passenger area 70.

Radiator 10 is located behind liquid-gas converter 4 and is connected to coolant pump 18 through coolant loop 20. Although radiator 10 is located behind liquid-gas converter 4, it is contemplated that radiator 10 could be located in front of liquid-gas converter 4. Radiator 10 can cool coolant fluids running through coolant loop 20 which are used to cool fuel cell 24 and/or motor with the inverter 26.

Coolant pump 18 is connected to radiator 10 and fuel cell 24 and/or motor with the inverter 26 through coolant loop 20. Coolant pump 18 aids in circulating coolant fluid through fuel cell 24, motor with the inverter 26, and/or radiator 10.

Optional fuel cell 24 is connected to coolant pump 18 and motor with the inverter 26 through coolant loop 20. Fuel cell 24 supplies electricity to motor with the inverter 26 which can be used to move automobile 2. In one embodiment, fuel cell 24 is an electrochemical energy conversion device and can produce electricity from various external quantities of fuel on an anode side and an oxidant on a cathode side. The fuel and the oxidant react through an electrolyte.

Fuel cell 24 can accomplish this, for example, by combining hydrogen and oxygen to produce dihydrogen oxide (water) and/or vapor. By combining hydrogen and oxygen, fuel cell 24 can generate electricity which can be used by motor with the inverter 26 to move automobile 2. Use of fuel cell 24 instead of a conventional battery can be advantageous for longer driving range per one fueling/charging and for shorter fueling/charging time. Fuel cell 24 can be cooled by coolant loop 20 as coolant fluid within coolant loop 20 can absorb heat from fuel cell 24.

Motor with the inverter 26 is connected to fuel cell 24 and radiator 10 through coolant loop 20. Coolant loop 20 can be used to cool and dissipate heat from motor with the inverter 26 by running coolant fluid through coolant loop 20 to absorb heat from motor with the inverter 26.

It is also contemplated that while fuel cell 24 and motor with the inverter 26 are used by automobile 26, the present invention can also be used with other energy sources and engines which may not have sufficient heat to produce enough heat to heat passenger area 70 by themselves, such as diesel engines, direct injection gasoline engines, gas-electric hybrid engines, electric motors and/or combination of these power trains.

Radiator fan 12 is located behind radiator 10 and is connected to control unit 14. In another embodiment, radiator fan 12 can be located behind radiator 10, and radiator fan 12 can also be located in front of radiator 10 between radiator 10 and liquid-gas converter 4. In yet another embodiment, radiator fan 12 can be located in front of both radiator 10 and liquid-gas converter 4. Radiator fan 12 can rotate in a first direction 74 to blow air from an area around fuel cell 24 and/or motor with the inverter 26 towards radiator 10 and/or liquid-gas converter 4. Radiator fan 12 can also rotate in a second direction 76 to suck air from outside automobile 2 towards liquid-gas converter 4, radiator 10, fuel cell 24, and/or motor with the inverter 26.

Temperature sensor 16 is located on or near the exterior of automobile 2 and is connected (via wires or wireless) to control unit 14. Temperature sensor 16 detects the ambient temperature of the air outside automobile 2. Temperature sensor 16 can be located immediately in front of liquid-gas converter 4, to the side of liquid-gas converter, on a bottom (not shown) of automobile 2, a front bumper (not shown) of automobile 2, a windshield (not shown) of automobile 2, a door (not shown) of automobile 2, a rear bumper (not shown) of automobile 2, a window (not shown) of automobile 2, a door panel (not shown) of automobile 2, an engine hood (not shown) of automobile 2, a roof (not shown) of automobile 2, and/or any other location of automobile 2. Furthermore, there can be more than one temperature sensor 16 to address different locations of automobile 2 to receive a more accurate reading of the ambient temperature of the air outside automobile 2.

Optional moisture sensor 66 is located on or near the exterior of automobile 2 and is connected to control unit 14. Moisture sensor 66 detects the ambient moisture content of the air outside automobile 2. For example, moisture sensor 66 can detect the amount of ambient moisture or relatively humidity of the ambient air. Furthermore, moisture sensor 66 can also detect whether there is condensation such as rain, fog, or snow in the ambient air. Moisture sensor 66 can be located immediately in front of liquid-gas converter 4, to the side of liquid-gas converter, on a bottom (not shown) of automobile 2, a front bumper (not shown) of automobile 2, a windshield (not shown) of automobile 2, a door (not shown) of automobile 2, a rear bumper (not shown) of automobile 2, a window (not shown) of automobile 2, a door panel (not shown) of automobile 2, an engine hood (not shown) of automobile 2, a roof (not shown) of automobile 2, and/or any other location of automobile 2. Furthermore, there can be more than one moisture sensor 66 to address different locations of automobile 2 to receive a more accurate reading of the ambient moisture outside automobile 2.

It is also contemplated that temperature sensor 16 and moisture sensor 66 can be located in relatively the same location of automobile 2. Furthermore, it is also contemplated that temperature sensor 16 and moisture sensor 66 can be combined into one device.

Control unit 14 is connected to temperature sensor 16, moisture sensor 66, and radiator fan 12. Control unit 14 can send a first signal to radiator fan 12 to rotate radiator fan 12 in a first direction to blow air from an area around fuel cell 24 and/or motor with the inverter 26 towards radiator 10 and/or liquid-gas converter 4. Control unit 14 can send the first signal to radiator fan 12 when, for example, the ambient temperature is below a predetermined temperature. Control unit 14 can also send the first signal to radiator fan 12 when, for example, the ambient temperature is below a predetermined temperature and the amount of ambient moisture is above a predetermined amount.

The predetermined temperature can be, for example, $-5°$ C., $0°$ C., $5°$ C., $10°$ C., $15°$ C., or any other suitable temperature to prevent or reduce ice accumulation on liquid-gas converter 4. Advantageously, if the predetermined temperature is selected at a temperature above 0° C. such as 5° C., more energy can be removed from the ambient air without the ambient air freezing and forming ice on liquid-gas converter 4. In one embodiment, when there is a low-moisture content in the air, the predetermined temperature can be low such as −5° C. or 0° C. In another embodiment, when there is a high moisture content in the air, it is preferable that the predetermined temperature be 10° C. or above.

Similarly, control unit 14 can also send a second signal to radiator fan 12 to rotate radiator fan 12 in a second direction to pull or suck air from outside automobile 2 towards liquid-gas converter 4, radiator 10, fuel cell 24, and/or motor with the inverter 26. Control unit 14 can send the second signal to radiator fan 12 when, for example, the ambient temperature is not below a predetermined temperature. Control unit 14 can also send the second signal to radiator fan 12 when, for example, the ambient temperature is not below a predetermined temperature and the ambient moisture is not above a predetermined amount.

Figure 2:
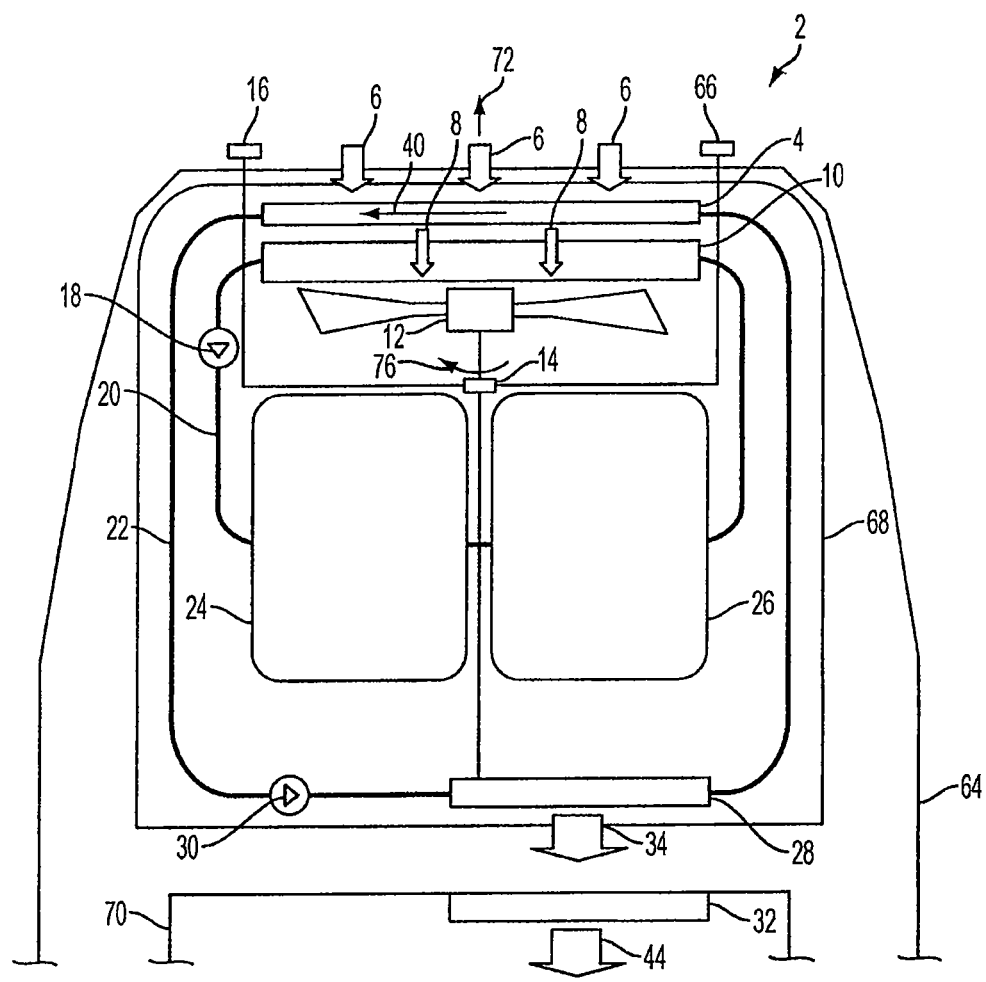
FIG. 2 is schematic diagram of the HVAC system according to an embodiment of the invention.

As seen in FIG. 2, in operation, automobile 2 generally travels in a forward direction 72. When passengers are cold and/or want to warm passenger area 70, a passenger can send a signal to control unit 14 by depressing a button (not shown) or shifting a knob (not shown). Temperature sensor 16 detects the ambient temperature and moisture sensor 66 detects the ambient moisture content of air 6 outside automobile 2.

When the ambient temperature of air 6 is not below a predetermined temperature, control unit 14 sends the second signal to radiator fan 12. Radiator fan 12 then rotates in a second direction 76 to suck air 6 from outside automobile 2 towards liquid-gas converter 4. Air 8 from air 6 is directed towards radiator 10, fuel cell 24, and/or motor with the inverter 26. Through a combination of liquid-gas converter 4 and HVAC compressor 30 or solely through liquid-gas converter 4, HVAC fluid 40 flowing through HVAC loop 22 is evaporated and is completely or partially converted from liquid to gas. Converting HVAC fluid 40 from liquid to gas removes energy from air 6 and stores the energy in HVAC fluid 40. HVAC fluid 40 is compressed by compressor 30 and heater core 28 disperses the energy accumulated in HVAC fluid 40 in warm air 34. Cabin fan 32 then blows warm air 44 from warm air 34 to passengers in passenger area 70.

As seen in FIG. 1, in one embodiment when the ambient temperature is below a predetermined temperature, control unit 14 sends the first signal to radiator fan 12. In another embodiment, when the ambient temperature is below a predetermined temperature and the ambient moisture content is above a predetermined amount, control unit 14 sends the first signal to radiator fan 12.

Once radiator 12 receives the first signal, radiator fan 12 rotates in a first direction 74 to blow air 44 from an area around fuel cell 24 and/or motor with the inverter 26 towards radiator 10. Air 42, which is air 44 after air 42 has passed through radiator 10, traverses through liquid-gas converter 4. Air 38, which is air 42 after air 38 has passed through liquid-gas converter 4, exits automobile 2. Even if fuel cell 24 and/or motor with the inverter 26 does not generate sufficient heat to warm passenger area 70 by themselves, it is contemplated that fuel cell 24 and/or motor with the inverter 26 may generate sufficient heat to prevent ice build up on liquid-gas converter 4. Furthermore, components aside from fuel cell 24 and/or motor with the inverter 26 can generate heat which can warm air 44 such as coolant pump 18, a hydrogen pump (not shown), or any other device used within automobile 2.

Through a combination of liquid-gas converter 4 and HVAC compressor 30 or solely through liquid-gas converter 4, HVAC fluid 40 flowing through HVAC loop 22 is evaporated and is completely or partially converted from liquid to gas.

Converting HVAC fluid 40 from liquid to gas removes energy from air 42 and stores the energy in HVAC fluid 40. Since air 42 is warmer than the ambient air, it is easier to remove energy from air 42 than it is to remove energy from the ambient air. Furthermore, the removal of energy from air 42 may be less likely to create ice on liquid-gas converter 4 since the removal of energy from air 42 may not be sufficient to chilly air 42 such that air 42 forms ice on liquid-gas converter 4. Also, since air 42 is from air 44, it may have less moisture content than the ambient air since there may not be rain, fog, and/or snow in air 44.

Less ice accumulation on liquid-gas converter 4 can also improve the efficiency of liquid-gas converter 4 since ice accumulation can serve to remove energy from liquid-gas converter 4. In addition, a reduced amount of ice accumulation on liquid-gas converter 4 can also reduce the amount of weight on automobile 2. This can improve the fuel efficiency of automobile 2 as heavier automobiles may require more energy to move than lighter automobiles.

HVAC fluid 40 is compressed by compressor 30 and heater core 28 disperses the energy accumulated in HVAC fluid 40 in warm air 46. Cabin fan 32 then blows warm air 48 from warm air 46 to passengers in passenger area 70.

When the ambient temperature of air 6 is not below a predetermined temperature, control unit 14 sends the second signal to radiator fan 12 and radiator fan 12 switches from rotating in a first direction 74 back to rotating in a second direction 76.

Figure 3:
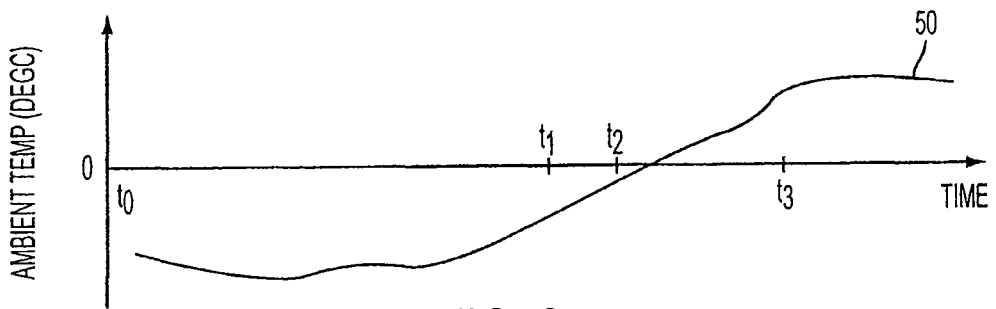
FIG. 3 is a graph of assumed ambient temperature over time according to an embodiment of the invention.

Referring now to FIGS. 3, 4, 5, and 6, some of the advantages of the invention over a conventional HVAC system may be seen during low humidity conditions. Low humidity conditions, for example, can be when there is a relatively low amount of moisture content in the ambient air. FIG. 3 is a chart of assumed ambient temperature over time.

Figure 4:
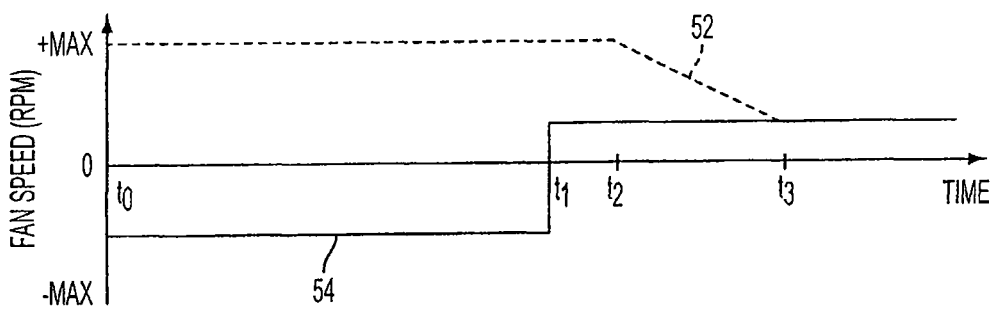
FIG. 4 is a graph of a comparison of fan speed over time according to an embodiment of the invention.

FIG. 4 is a graph of a comparison of fan speed over time. A fan speed of a conventional radiator fan in a conventional HVAC system is indicated by line 52 while a fan speed of radiator fan 12 of the invention is indicated by line 54.

Figure 5:
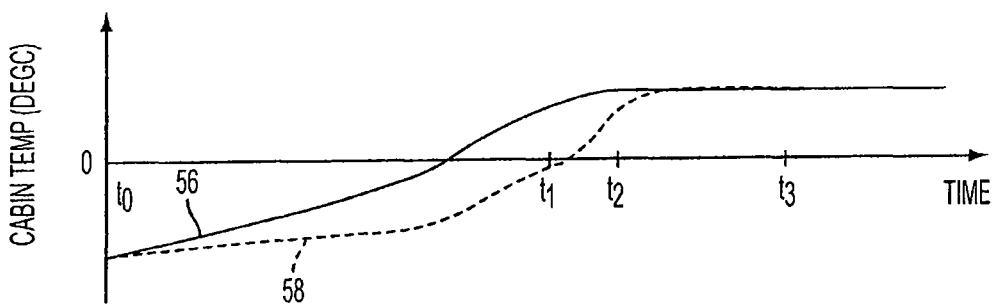
FIG. 5 is a graph of a comparison of cabin temperature over time according to an embodiment of the invention.

FIG. 5 is a graph of a comparison of cabin temperature over time. A temperature of a cabin or passenger area using the conventional HVAC system is indicated by line 58. A temperature of a cabin or passenger area 70 using the invention is indicated by line 56.

Figure 6:
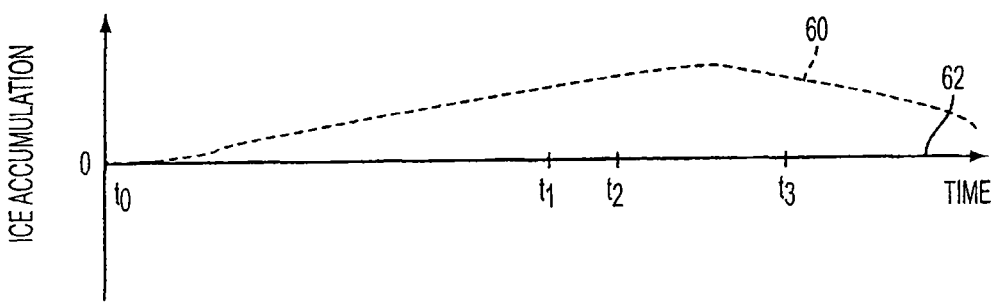
FIG. 6 is a graph of a comparison of ice accumulation over time according to an embodiment of the invention.

FIG. 6 is a graph of a comparison of ice accumulation over time. Ice accumulation in a conventional condenser in a conventional HVAC system is indicated by line 60 while ice accumulation of the invention is indicated by line 62.

From time $t_0$ to time $t_1$, the ambient temperature is below the predetermined temperature. Thus, radiator fan 12 rotates in the first direction drawing air 44 from an area around fuel cell 24 and/or motor with the inverter 26 as indicated by line 54. However, the conventional fan is still rotating in the first direction at maximum speed as indicated by line 52 to retrieve maximum available energy. Since liquid-gas converter 4 is receiving air 44 which is warmer than the ambient air, the cabin temperature can increase at a more rapid rate than in conventional HVAC systems. Furthermore, while ice is accumulating on the conventional condenser as seen in line 60, ice accumulation of the invention is minimal as seen in line 62. Furthermore, since air 44 is warmer than the ambient air, radiator fan 12 does not need to rotate as fast as the conventional fan as seen in FIG. 4.

At time $t_1$, the ambient temperature is warmer than a predetermined temperature. Thus, at time $t_1$, radiator fan 12 rotates in a second direction 76 drawing air from the outside. Since there is little ice accumulation on liquid-gas converter 4 as shown in FIG. 6 when compared to the conventional condenser, radiator fan 12 does not need to rotate as fast as the conventional fan.

Between time $t_1$ and time $t_2$, the cabin temperature of the invention reaches the desired temperature as indicated by the plateau of the cabin temperature.

At time $t_2$, the conventional fan begins to reduce its speed as the cabin temperature is approaching the desired temperature. However, ice accumulation may still increase in the conventional condenser.

At time $t_3$, the conventional fan has the same rotational speed as radiator fan 12. However, there is still ice accumulation on the conventional condenser. Sometime, between time $t_2$ and time $t_3$, the cabin temperature of the conventional HVAC system reaches the desired temperature as indicated by the plateau of the cabin temperature.

Notably, in the invention, radiator fan 12 can run at a reduced speed for a longer period of time. Furthermore, the invention increases the cabin temperature quicker such that it reaches the desired temperature quicker than in the conventional HVAC system. In addition, the invention has a reduced amount of ice accumulation on the liquid-gas converter 4 when compared with the ice accumulation on the conventional condenser.

Those of ordinary skill would appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for reducing energy consumption in a HVAC system in an automobile having a front portion and a rear portion, and a central axis extending from the front portion to the rear portion, and the automobile having a frame defining an engine bay and a passenger area, the frame having a front end proximal to a front end of the automobile, the method comprising the steps of:

providing a liquid-gas converter located on the central axis in front of the engine bay and behind the front end of the frame;

providing a radiator located on the central axis behind and adjacent the liquid-gas converter;

circulating a first fluid in a first fluid loop positioned in the engine bay and connected to a compressor, the liquid-gas converter and a heater core located between the engine bay and the passenger area;

converting, using the liquid-gas converter, the first fluid in the first fluid loop from liquid to gas or from gas to liquid;

compressing, using the compressor, the first fluid in the first fluid loop;

circulating a second fluid in a second fluid loop positioned in and solely confined to the engine bay separate from the first fluid loop and connected to a coolant pump, the radiator, a motor with an inverter and a fuel cell configured to supply electricity to the motor with the inverter;

cooling, using the radiator, the second fluid in the second fluid loop in order to cool the motor with the inverter or the fuel cell;

determining, using a temperature sensor located outside the engine bay and coupled with the frame, an ambient temperature of an ambient air to an exterior of the automobile;

determining, using a moisture sensor located outside the engine bay and coupled with the frame, an ambient moisture content of the ambient air to the exterior of the automobile;

providing a first fan located on the central axis adjacent and behind the radiator, the first fan capable of rotating at a maximum speed;

rotating the first fan in a first direction at a first speed below the maximum speed for transmitting a first airflow heated by the radiator and the fuel cell and the motor with the inverter towards the liquid-gas converter when the ambient temperature is below a predetermined temperature that is set below a desired passenger area temperature for reducing an amount of ice that fauns on the liquid-gas converter, the predetermined temperature having a first predetermined temperature value when the ambient moisture content is below a predetermined moisture content value, and having a second predetermined temperature value greater than the first predetermined temperature value when the ambient moisture content is greater than the predetermined moisture content value;

rotating the first fan in a second direction at a second speed below the maximum speed for transmitting a second airflow from an area outside the engine bay towards the liquid-gas converter when the ambient temperature is not below the predetermined temperature;

receiving, using the heater core, the circulated first fluid via the first fluid loop;

transferring, using the heater core, a third airflow into the passenger area using accumulated energy from the circulated first fluid in the first fluid loop; and transmitting, using a second fan located adjacent the heater core, the third airflow towards the passenger area, wherein the first speed remains substantially constant as the ambient temperature increases from a first temperature less than 0° C. to a second temperature greater than the first temperature and less than the predetermined temperature, and the second speed remains substantially constant as the ambient temperature increases from a third temperature greater than the predetermined temperature to a fourth temperature greater than the third temperature.

2. The method of claim 1 wherein the first fluid in the first fluid loop does not come into contact with the second fluid in the second fluid loop, and the third airflow transferred into the passenger area being separated and independent from the second fluid loop.

3. The method of claim 1 wherein the first predetermined temperature value is selected to be a temperature in the range of −5° C. to 0° C., and the second predetermined temperature value is 10° C.

4. The method of claim 1 wherein the liquid-gas converter is an evaporator located at the front portion of the automobile.

5. The method of claim 1 wherein the heater core operates as a condenser.

* * * * *